March 21, 1950 S. P. ZBELL 2,501,462
AUTOFOCUS PROJECTION PRINTER
Filed Feb. 24, 1947 2 Sheets-Sheet 1
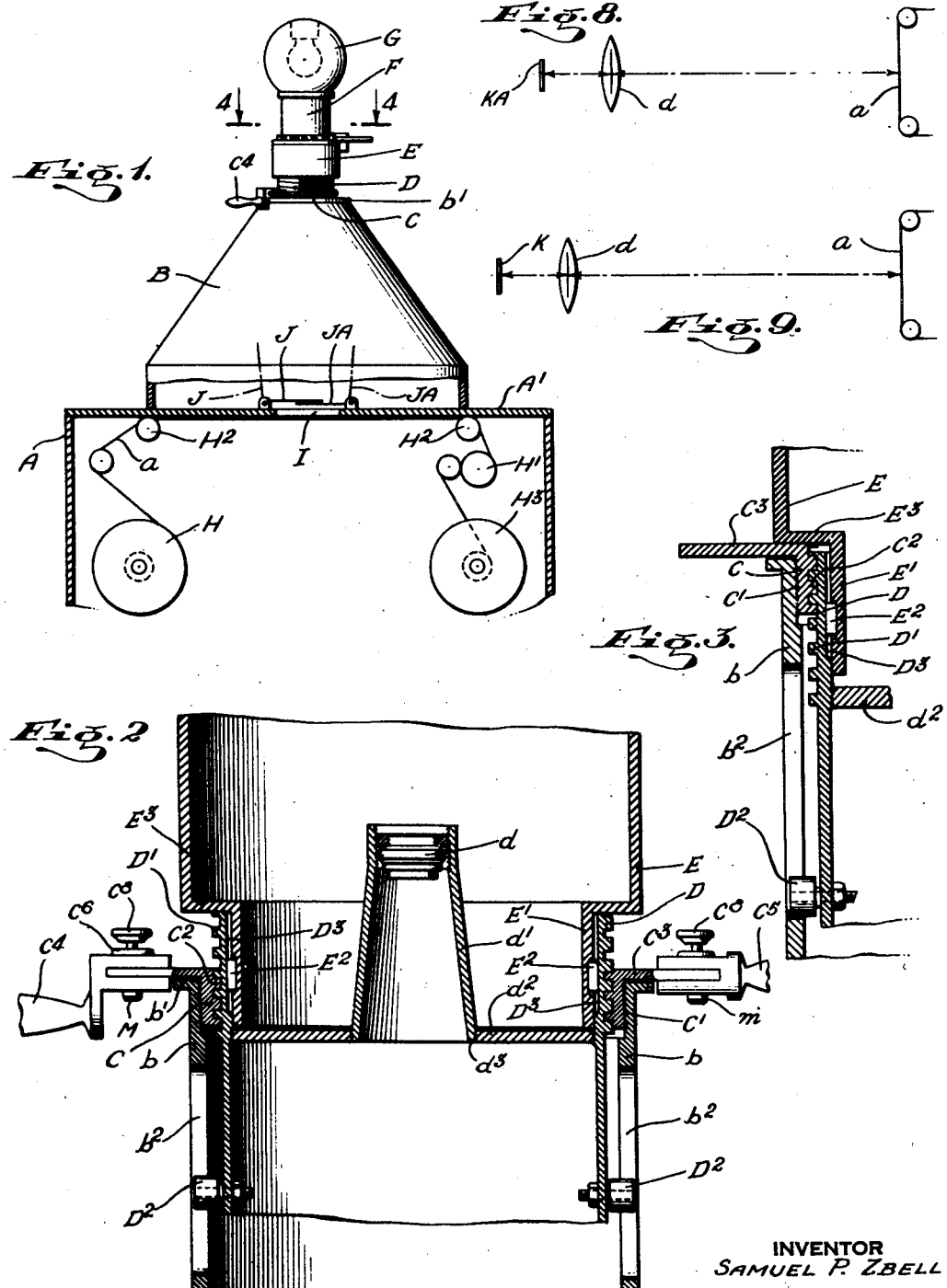
INVENTOR
SAMUEL P. ZBELL
BY John S. Hubbell
ATTORNEY March 21, 1950 S. P. ZBELL 2,501,462
AUTOFOCUS PROJECTION PRINTER
Filed Feb. 24, 1947 2 Sheets-Sheet 2

INVENTOR
SAMUEL P. ZBELL
BY
John E. Hubbell
ATTORNEY

Patented Mar. 21, 1950

2,501,462

UNITED STATES PATENT OFFICE 2,501,462

AUTOFOCUS PROJECTION PRINTER

Samuel P. Zbell, Pelham, N. Y., assignor to Pavelle Color Incorporated, New York, N. Y., a corporation of Delaware Application February 24, 1947, Serial No. 730,463

3 Claims. (Cl. 88—24)

The present invention relates to projection printers of the type in which light is passed through a transparency and an objective lens to light-sensitive photographic material to reproduce on the latter the image borne by the transparency. The general object of the invention is to provide a projection printer of the above-mentioned type with novel means of a simple and effective character for rapidly and accurately varying the reproduction scale, i. e. the ratio of the size of the picture printed to the size of the transparency.

The invention was primarily devised for the use of a projection printer in printing pictures of the same size from transparencies of two different sizes. For example, one transparency may be the section of the film of a so-called 35 millimeter camera exposed in taking a single picture, while the other transparency is the film section exposed in taking a picture in a camera of the type known as a Bantam, the last mentioned section being slightly wider and slightly longer than the 35 millimeter camera film section.

In the use of a projection printer, the ratio of the size of the picture printed to the size of the transparency carrying the image reproduced in the picture, depends upon the optical system of the projection printer, and in particular on the relation of the distance between the reproducing or objective lens and transparency, to the distance between said lens and the film or other light sensitive material on which the transparency image is reproduced. In order that the image may be focussed with suitable sharpness on the plane of the material on which the image is to be reproduced, a definite change in the reproduction scale requires a definite and predeterminable adjustment of the distance between the transparency and the reproduction plane, and a definitely related but slightly different adjustment of the objective lens toward and away from the reproduction plane.

A specific object of the present invention is to provide a projection printer with a focussing element which, on an angular adjustment substantially smaller than 360°, will move the transparency and objective lens relative to the reproduction plane through the predetermined different distances between their respective positions suitable for the reproduction of the transparency image to one predetermined reproduction scale and their respective positions suitable for the reproduction of the transparency image to a different predetermined scale.

The various features of novelty which characterize my invention are pointed out with particularity in the claims annexed to and forming a part of this specification. For a better understanding of the invention, however, its advantages and specific objects attained with its use, reference should be had to the accompanying drawing and descriptive matter in which I have illustrated and described a preferred embodiment of the invention.

Of the drawings:

Fig. 1 is a somewhat diagrammatic elevation, partly in section, of a projection printer adjusted to print a picture from a relatively small transparency;

Fig. 2 is an elevation in section of a portion of the apparatus shown in Fig. 1;

Fig. 3 is a sectional elevation showing parts shown in Fig. 2 in different relative positions;

Figures 6, 7:
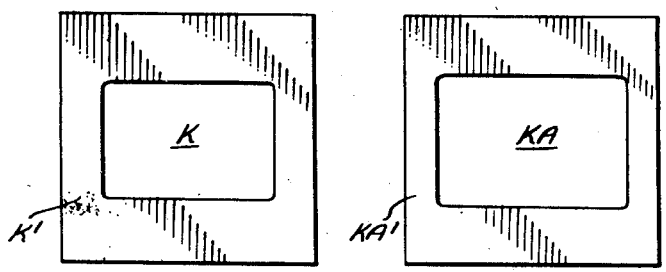

Figs. 6 and 7 are plan views of transparencies of two different sizes from which pictures of the same size are to be reproduced; and Figs. 8 and 9 are diagrams illustrating the optical system of the printer in its different adjustments required to print pictures of the same size from the larger and smaller transparencies shown in Figs. 6 and 7, respectively.

In the drawings I have illustrated the use of the present invention in a projection printer comprising a housing or hollow frame structure including a film housing section A, a projector housing section B, an annular focussing adjustment element C, a main lens section D, including an objective lens $d$, a transparency section E including a transparency support $e$, a condenser section F and a lamp housing section G. In some cases two or more of said sections may be integrally combined, and one or more of the above mentioned sections may consist of two or more separately formed parts. In any event, the sections A and B may well be rigidly connected to form one mechanical unit, and the sections E, F and G may well be rigidly connected to one another to form a second mechanical unit. In the form of the invention illustrated herein, however, said two units and the sections C and D must each be movable relative to each of the others.

The film housing A encloses apparatus for supporting and intermittently advancing a film $a$ of light sensitive, photographic material. As shown, said apparatus includes a supply roll H, a feed roll H' and guide rolls H³ at opposite sides of an orifice I formed in the top wall A' of the film housing A and a take-up roll H². A shutter mechanism shown as comprising a pair of shutter flaps J and JA is mounted within the projector housing section B for turning movement of said flaps between a shutter open position shown in dotted lines in Fig. 1, in which the flaps extend perpendicularly away from the portion A' and a shutter closed position shown in full lines in which the flaps overlap and prevent the passage of light through the orifice I. As shown, the housing section B comprises a conical body portion, in the smaller upper end of which is rigidly secured a bushing element $b$ having an out-turned flange $b'$ at its upper end. Except for its adjustable focussing section C and the means associated therewith for adjusting the transparency and objective lens toward and away from the portion of the film $a$ in register with the orifice I, the projection printer disclosed herein may be of a type and form disclosed and claimed in the application for patent of Leo Pavelle, Serial No. 614,628, filed September 6, 1946, and now in commercial use in printing color pictures from natural color transparencies.

The annular adjusting element C comprises a tubular body portion mounted in the bushing $b$ for rotative movement about the axis of the projecting printer. In the form shown, the tubular body portion of the adjusting element C is externally threaded and the bushing $b$ is internally threaded to provide a fine pitch threaded connection C'. Owing to the threaded connection C', the angular adjustment of the element C is attended by a small proportional adjustment of the element C in the direction of its axis. However, the total required angular adjustment of the element C, which is limited as is hereinafter described, may well be no more than 120° or so and the resultant axial movement of the element C may be so small as to have no practical significance. Such axial movement is a mere incident of the threaded connection between the element C and the bushing $b$, which forms a practically convenient, though not essential, arrangement of the member C for angular adjustment. The inner surface of the tubular body portion of the element C is formed with a plurality of side by side spiral threads $C^2$ of coarse pitch. The element C is formed at its upper end with an out-turned flange $C^3$ having handle extensions $C^4$ and $C^5$ at opposite sides.

The main or objective lens supporting section D is a tubular element provided at its periphery with thread ribs D' of coarse pitch which cooperate with the thread ribs $C^2$ at the inner side of the adjusting element C, to give a substantial vertical adjustment to the lens support on a relatively small angular adjustment of the element C. The element C and the housing section B have one or more spline connections, two being shown, and each comprising a guide slot $b^2$ formed in the lower portion of the bushing $b$ and parallel to the axis of the printer and a separate projection $D^2$ entering each of the guide slots $b^2$. Each projection $D^2$ is secured to and extends radially away from the lower end of the section D. As shown, the slope or inclination to the horizontal of the coarse pitch thread ribs $C^2$ and D' is about 20°, and when the internal diameter of the bushing $b$ is of the order of 7 inches, as it is in an embodiment of the invention now in commercial use, an adjustment of the element C through an angle of about 120° is sufficient to adjust the upper end of the lens support D from a level about one-eighth of an inch below the level of the upper end of the element C, to a level about one and seven-eighths inches above the upper end of the element C.

As shown, the object lens $d$ is mounted in a conical lens tube $d'$ having its lower and larger end secured to a circular plate $d^2$ formed with a central opening $d^3$ in said plate. The latter is secured at its periphery to the inner side of the tubular section D, as by means of a threaded connection. As shown, the opening $d^3$ is internally threaded and the lower end of the lens tube $d'$ is externally threaded and screwed into the opening $d^3$.

The transparency supporting section E comprises a main tubular body portion of larger diameter than the section D and a spigot-like lower end portion E' of reduced diameter which has a sliding fit in the upper end of the section D. As shown, one or more spline connections between the sections D and E are provided to permit relative axial movements of the two sections while preventing them from having relative angular movements. Each such spline connection comprises a longitudinal slot $D^3$ formed in the member D and a longitudinal key $E^2$ attached to the spigot portion E' of the member E and received in the slot $D^3$. As shown, the upper end of the spigot portion E' is integrally connected to the lower end of the body portion of the section E by a transverse annular flange portion $E^3$.

When the apparatus is adjusted to print a picture from a relatively large transparency, the upper end of the member D is at a small predetermined distance below the level of the upper side of the member C as shown in Fig. 3. The portion $E^3$ of the transparency supporting section E then rests upon the member C. When the member C is turned to adjust the apparatus into the condition for printing a picture from a relatively small transparency, the coarse thread connection between the members C and D raises the latter into its position shown in Fig. 1 in which the upper end of the member D is at a level at a predetermined distance above the upper side of the member C. As the upper end of the member D is moved up above the level of the upper side of the member C, the weight of the section E and apparatus supported by it, is transferred from the upper side of the member C to the upper end of the member D. The manner in which the member D then supports the section E is clearly shown in Fig. 2, in which the member D and parts supported by it are shown in positions intermediate their upper and lower positions.

Figure 4:
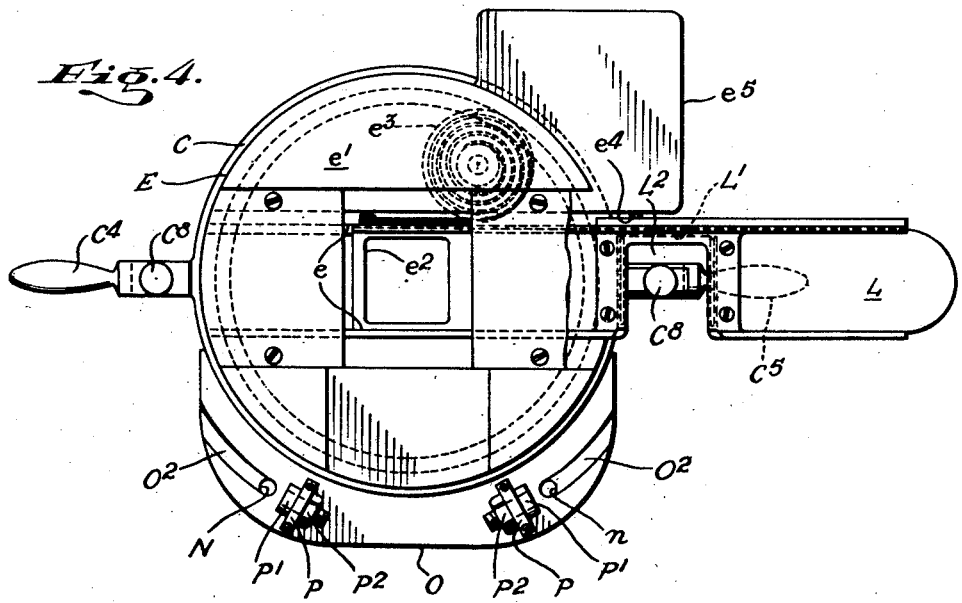
Fig. 4 is a plan section on the line 4—4 of Fig. 1.

In reproducing the image carried by either the transparency K, or by the somewhat larger transparency KA, the transparency is mounted in a seat L' at the margin of an opening $L^2$ in a horizontally elongated transparency holder or slide L, slindingly received in a guideway $e$ provided adjacent the upper end of the member E. As shown, the guideway $e$ is above a diaphragm $e'$ extending across the member E, and formed with a central orifice $e^2$ with which the transparency mounted in the seat L' of the slide L is in register when the latter is in its picture printing position. As shown in Fig. 4, the support or slide L is retracted from the section E to move the seat L' out of the section E so that a transparency may readily be inserted in, or removed from the seat L'. As indicated in Fig. 4, a spiral spring $e^3$, of the type customarily employed to bias a typewriter carriage for movement to the right, may be mounted in the section E as shown, to bias the slide L for movement into its non-operative position, shown in Fig. 4.

A bolt $e^4$ is mounted in a housing $e^5$ to releasably lock the slide L in its operative position in which the seat L' is in register with the diaphragm opening $e^2$. Automatic means for actuating the bolt $e^4$ to unlock the slide L at the conclusion of a printing operation, are disclosed in said application, Serial No. 614,628, but need not be illustrated or described herein.

Figure 5:
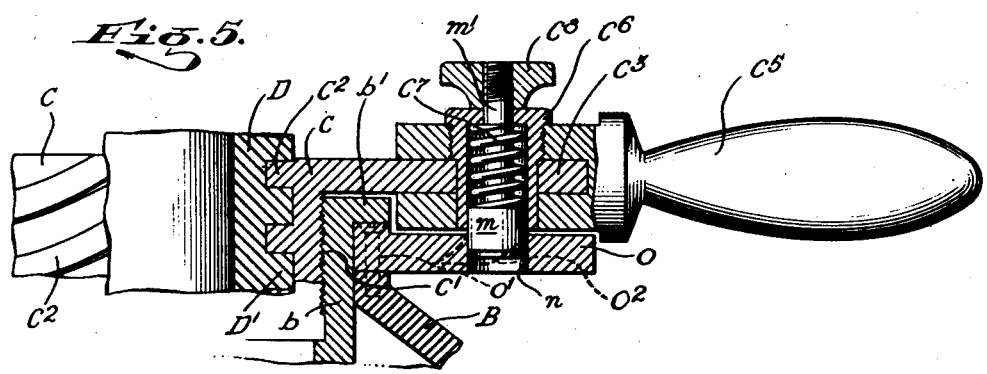
Fig. 5 is a section on the line 5—5 of Fig. 4.

Each of the transparencies K and KA is advantageously mounted in a frame K' or KA', respectively, which may be formed of sheet metal, paper, plastic or other material, and is shaped and proportioned to fit in the seat L'. Ordinarily, and as shown in Figs. 5 and 6, the transparencies K and KA are each oblong, and their frames K' and KA', respectively, are square in outline so that the length of the transparency may be placed in the holder L parallel to or transverse to the length of the latter. This permits the pictures printed to extend across the film $a$, as is desirable when the width of that film is equal to the length of the picture to be produced, and permits the picture to be printed with its length parallel to the length of the film when the film is narrower.

While the overall dimensions of the transparency frames and dimensions of the transparencies will vary with the dimensions of the projection printer and the intended conditions of use, it is noted, by way of example, that in reproducing pictures made in a 35 millimeter camera, the frame K is 2 inches square and the rectangular opening in the frame, which corresponds to the effective dimensions of the transparency K, is approximately $1\frac{5}{16}$ inches long and approximately $\frac{7}{8}$ of an inch wide. The opening in the Bantam frame KA is approximately $1\frac{1}{2}$ inches long and 1 inch wide.

In an embodiment of the invention now in commercial use and adapted to print pictures of the same size from transparencies K and KA, having the dimensions above stated, the distance between the plane of the transparency and the portion of the film $a$ on which the picture is being printed, is 16 inches in reproducing the image on the transparency KA, and is $17\frac{7}{8}$ inches in reproducing the image on the smaller transparency K, and the distance between the plane of the lens $d$ and the film $a$ is approximately $12\frac{7}{8}$ inches in reproducing the picture on the transparency KA and is $14\frac{7}{8}$ inches in reproducing the image on the transparency K. As those skilled in the art will understand, while the ratio of the distance between the lens $d$ and the transparency K or KA, to the distance between the lens and the film $a$ is determined by the reproduction scale, the actual distance between the transparency and film in each case is dependent on the focal length of the lens.

For the use of the apparatus disclosed in printing pictures of the same size from transparencies of two particular sizes, such as the 35 millimeter and Bantam sizes, the position of the member C at each end of its range of adjustment must be precisely fixed and invariable. Various mechanical expedients may be used to insure that each angular adjustment of the member C is arrested exactly where it should be. In the form shown, the end positions of the member C are fixed by means including a sliding pawl or bolt M mounted in the handle $C^4$, and a similar sliding pawl or bolt $m$ mounted in the handle $C^5$. Thus, when the member C is turned counter clockwise, as seen in Fig. 4, to raise the section E into the position shown in Fig. 1, the turning movement is interrupted when the bolt M is in position to enter a hole N formed for the purpose in a horizontal flange-like part O. In some cases the flange O may be integral with housing B, but in the form shown the flange O is a separate part extending into a notch formed in the upper end portion of the member B and is secured to the latter by screws O'. When the member C has been turned clockwise, as seen in Fig. 4, to lower the section E into its lower position, shown in Fig. 3, the bolt $m$ is brought into register with and enters an opening $n$ formed in the flange part O. On the assumption that the handles $C^4$ and $C^5$ are diametrically opposed, as shown, and that the range of angular movement given the member C is approximately 120°, the angular distance between the holes N and $n$ will be approximately 60°.

The handles $C^4$ and $C^5$ may be secured to the member C in any convenient manner. As shown, each handle is formed with a slot in its inner end portion to receive an outwardly extending portion of the flange $C^3$, and is anchored in place by a tubular member $C^6$ having an upper, externally threaded portion screwed into the handle. As is shown in Fig. 5, the member $C^6$ associated with the handle $C^5$ slidingly receives the pawl or bolt $m$ and a spring $C^7$ biasing the bolt for down movement into its locking position. The bolt $m$ has an upper stem extension $m'$ with a knob or handle $C^8$ connected to its upper end. The knob $C^8$ limits the down movement of the pawl $m$ and forms an element which may be used by the operator to withdraw the pawl $m$ from the opening $n$ when extending into the latter. The spring $C^6$ forces the pawl $m$ into the opening $n$ in the flange O whenever the member C is adapted to bring the pawl $m$ into register with the opening $n$. When it is desired to give the member C an angular adjustment away from the position in which the pawl $m$ is received in the opening $n$, the operator gives an upward pull to the knob $C^8$ and thus pulls the pawl or plunger $m$ out of the opening $n$. The pawl M may be formed and mounted in the other handle exactly as the pawl $m$ is shown in the handle $C^5$.

When the adjustment of the member C is such that either handle is not above the flange O, the corresponding pawl M or $m$ is in the position shown in Fig. 2 and has its lower end appreciably below the level of the top of the flange O. To automatically raise each of the pawls M and $m$ to a level in which it may enter the respective opening N or $n$, the member O is slotted to form two inclined guideways $O^2$ respectively leading to the openings N and $n$ formed at the adjacent edge of the flange part O so that as each pawl approaches the corresponding hole, it is raised by the engagement of its lower end with the bottom wall of the corresponding slot $O^2$.

To prevent undue strain on the pawl M and $m$ and on the upper ends of the walls of the openings N and $n$, adjustable stops or bumper elements P, are mounted on the flange O in position to be engaged by each of the handles $C^4$ and $C^5$ and to arrest its angular movement as soon as the pawl carried by the handle is in position to enter the corresponding opening N or $n$. As shown, each bumper element P comprises a bracket which is connected by screws to the flange O and extends upward from the latter, and an abutment shown as formed by the head of a horizontal bolt P' threaded through the bracket and secured in any desired axial adjustment by a lock nut P². When properly adjusted, the head of each abutment bolt is in position to be engaged by the corresponding handle as the latter moves its locking pawl or plunger M or m along the corresponding guideway O³ into position to engage the corresponding opening N or n in the flange part O.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. In apparatus for photographically reproducing an image on a transparency by transmitting light through the transparency and thence through a focusing lens to light sensitive photographic material, the combination of a transparency support, a body having a photographic material supporting seat, a focusing lens between said support and seat, and adjusting means for effecting a predetermined adjustment of the reproduction scale of said apparatus, said means comprising a member including a tubular threaded portion with its axis transverse to and intersecting said seat and mounted in said body for rotation about said axis, between first and second positions, a support for said lens mounted in said body for longitudinal movement in the direction of said axis without rotative movement about said axis and comprising a threaded portion in threaded engagement with said member and given a longitudinal movement through a predetermined distance by the rotation of said member between its first and second positions, and structure forming a lost motion connection between said lens and transparency supports causing said transparency support to move with said lens support during a portion, and permitting said lens support to remain stationary during the remainder of the movement of said lens support through its said predetermined distance, whereby the movement of said lens support through said predetermined distance adjusts said transparency toward and away from said body support through a predetermined distance different from the first mentioned distance.

2. In apparatus for photographically reproducing an image on a transparency by transmitting light through the transparency and thence through a focusing lens to light sensitive photographic material, the combination of a transparency support, a body having a photographic material supporting seat, a focusing lens between said support and seat, and adjusting means for effecting a predetermined adjustment of the reproduction scale of said apparatus, said means comprising a member including a tubular threaded portion with its axis transverse to and intersecting said seat and mounted in said body for rotation about said axis between first and second positions, a support for said lens mounted in said body for longitudinal movement in the direction of said axis without rotative movement about said axis and comprising a threaded portion in threaded engagement with said member and given a longitudinal movement through a predetermined distance by the rotation of said member between its first and second positions, structure forming a connection between said lens and transparency supports through which the movement of said lens support through said predetermined distance adjusts said transparency toward and away from said body support through a predetermined distance different from the first mentioned distance, and manually releasable means for automatically locking said member to said body in each of its first and second positions when in such positions.

3. In apparatus for photographically reproducing an image on a transparency by transmitting light through the transparency and thence through a focusing lens to light sensitive photographic material, the combination of a member having a photographic material support, a focusing lens at one side of said support, an internally threaded hollow cylinder mounted in said member at said one side of said support for rotation about the axis of said cylinder between first and second cylinder positions, a lens support mounted in said member for longitudinal movement in the direction of said axis, means through which said member prevents said lens support from rotating about its axis, said lens support comprising a tubular portion externally threaded and in threaded engagement with said cylinder for movement in the direction of said axis respectively between predetermined positions more and less remote from said material support as said cylinder is rotated between its first and second positions, a transparency support comprising a tubular portion telescopically received in the tubular portion of said lens support and biased for movement toward said material support, and also comprising an outwardly extending flange portion more remote from said material support than the tubular portion of the transparency support, and means arranged to engage said flange and arrest movement of said transparency support toward said material support when said flange is at a distance from said material support which is greater than the distance between the latter end of said cylinder and the end of the tubular portion of the lens support nearest to said flange when said lens support is in a predetermined position intermediate its upper two first mentioned positions, whereby the rotation of said cylinder between its first and second positions is adapted to vary the ratio of the distance between the transparency and lens to the distance between the lens and photographic material and thereby the reproduction scale of the apparatus.

SAMUEL P. ZBELL.

REFERENCES CITED

The following references are of record in the file of this patent:

UNITED STATES PATENTS

| Number | Name | Date |
| --- | --- | --- |
| 1,623,538 | Hopkins | Apr. 5, 1927 |
| 1,645,367 | August | Oct. 11, 1927 |
| 1,649,646 | Badgley | Nov. 15, 1927 |
| 1,873,758 | Ginsberg | Aug. 23, 1932 |
| 1,883,673 | Fouquet | Oct. 18, 1932 |
| 2,135,074 | Grant | Nov. 1, 1938 |
| 2,231,731 | Mihalyi | Feb. 11, 1941 |